(12) United States Patent
Neumeier

(10) Patent No.: US 7,913,595 B2
(45) Date of Patent: Mar. 29, 2011

(54) CLUTCH DEVICE FOR TOOL HOLDERS OR FOR WORKPIECE CHUCKING DEVICE

(75) Inventor: Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 506 days.

(21) Appl. No.: 12/009,296

(22) Filed: Jan. 17, 2008

(65) Prior Publication Data
US 2008/0203682 A1 Aug. 28, 2008

(30) Foreign Application Priority Data

Feb. 23, 2007 (DE) .......................... 10 2007 008 837

(51) Int. Cl.
B23Q 37/00 (2006.01)
B23B 31/02 (2006.01)
(52) U.S. Cl. ............................................. 82/96; 82/155
(58) Field of Classification Search .................... 82/155, 82/96, 152, 153, 905; 279/143; 192/48.5, 192/48.1
See application file for complete search history.

(56) References Cited

U.S. PATENT DOCUMENTS

| 3,348,645 | A | * | 10/1967 | Sigg | 192/69.9 |
| 3,873,863 | A | | 3/1975 | Pew | |
| 5,007,151 | A | * | 4/1991 | Gusching | 29/33 J |
| 5,125,142 | A | * | 6/1992 | Kosho et al. | 29/40 |
| 6,171,033 | B1 | | 1/2001 | Wrobel | |
| 6,901,825 | B1 | | 6/2005 | Lebron | |

FOREIGN PATENT DOCUMENTS

| DE | G 91 01 150.7 | 1/1991 |
| DE | 195 44 715 A1 | 6/1996 |
| DE | 196 07 735 A1 | 4/1997 |
| DE | 199 40 330 A1 | 3/2001 |
| DE | 19940330 C2 | 3/2001 |
| DE | 202 18 151 U1 | 6/2004 |
| EP | 1 211-017 A1 | 4/2000 |
| WO | WO 96/30163 | 10/1996 |
| WO | WO 03/039379 A1 | 5/2002 |

OTHER PUBLICATIONS

European Patent Office Search Report; Feb. 4, 2008.
1$^{st}$ Office Action—German Patent and Trademark Office dated Oct. 19, 2007.
European Patent Office and Search Report dated Jun. 21, 2010.

* cited by examiner

Primary Examiner — Will Fridie, Jr.
(74) Attorney, Agent, or Firm — Emch, Schaffer, Schaub & Porcello Co., L.P.A.

(57) ABSTRACT

A clutch device for tool holders or tool chucking or workpiece chucking devices is used for the releasable form-fitting engagement of a drive shaft, comprising a spindle of the tool holder or chucking devices, said spindle being coaxial with the drive shaft. The drive shaft and the spindle have separate dog elements, whereby, between the two dog elements, a clutch element is arranged that compensates for alignment errors between the drive shaft and the spindle and that can be moved in a limited manner between the drive shaft and the spindle. The clutch element is in form-fitting engagement with the dog elements of the drive shaft and of the spindle.

27 Claims, 5 Drawing Sheets

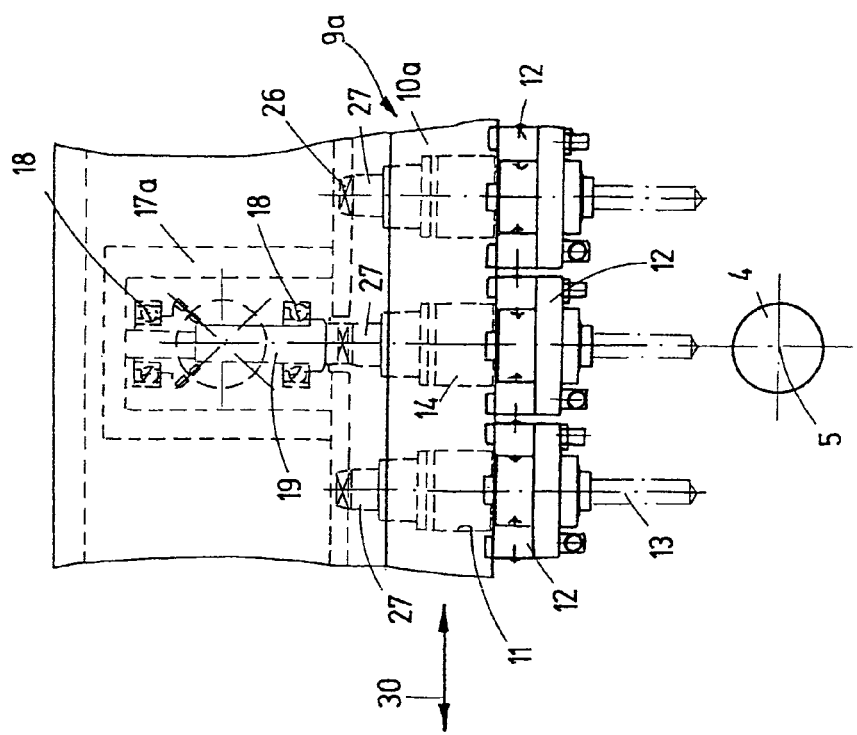
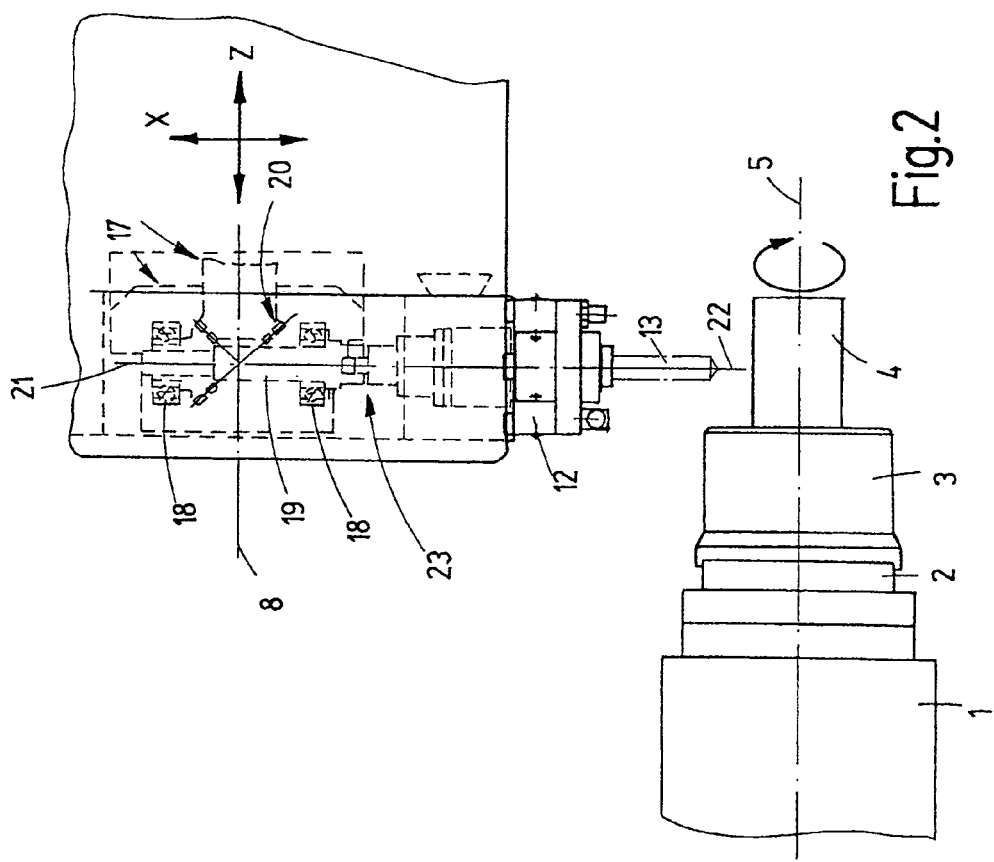
Fig.2
Fig.3

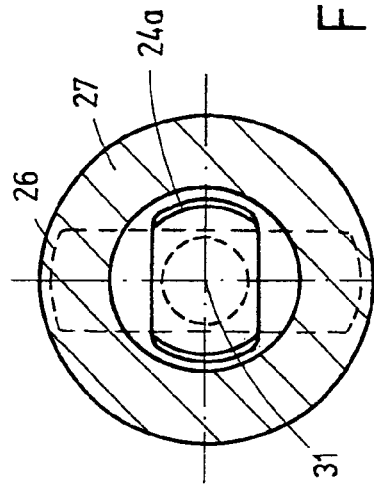
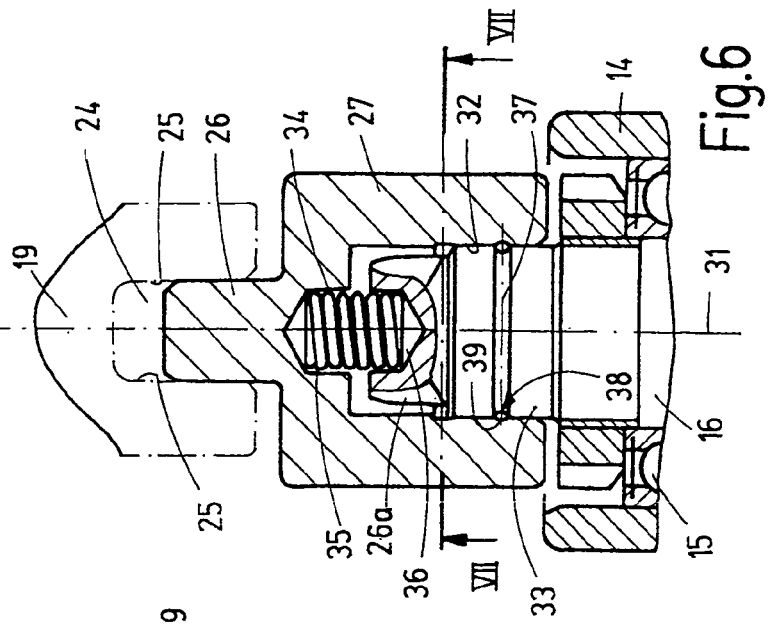
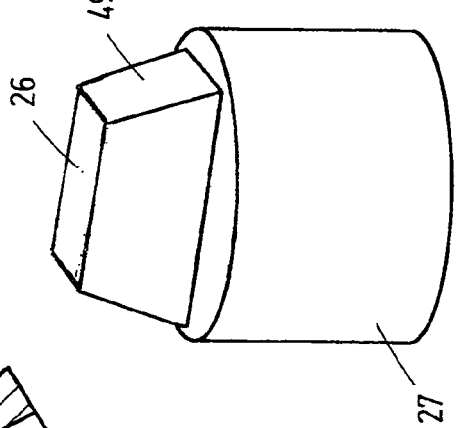
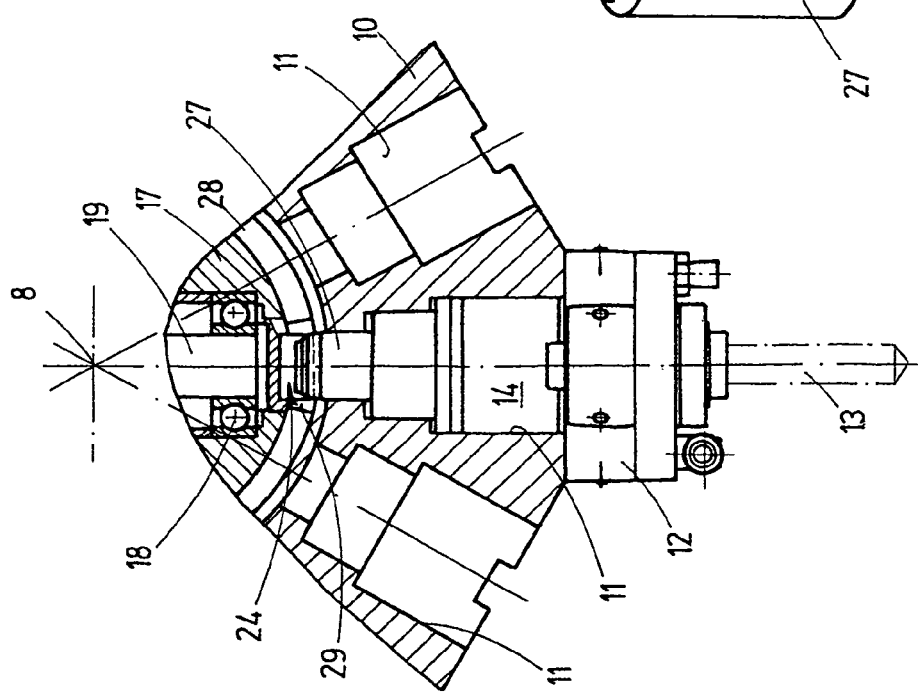

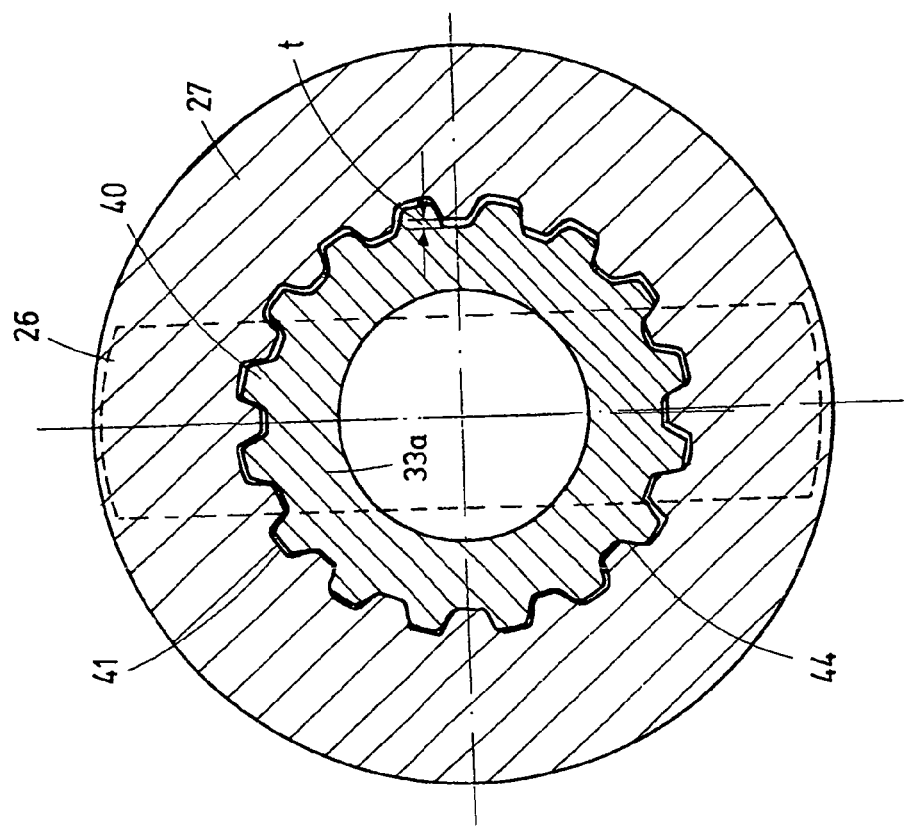
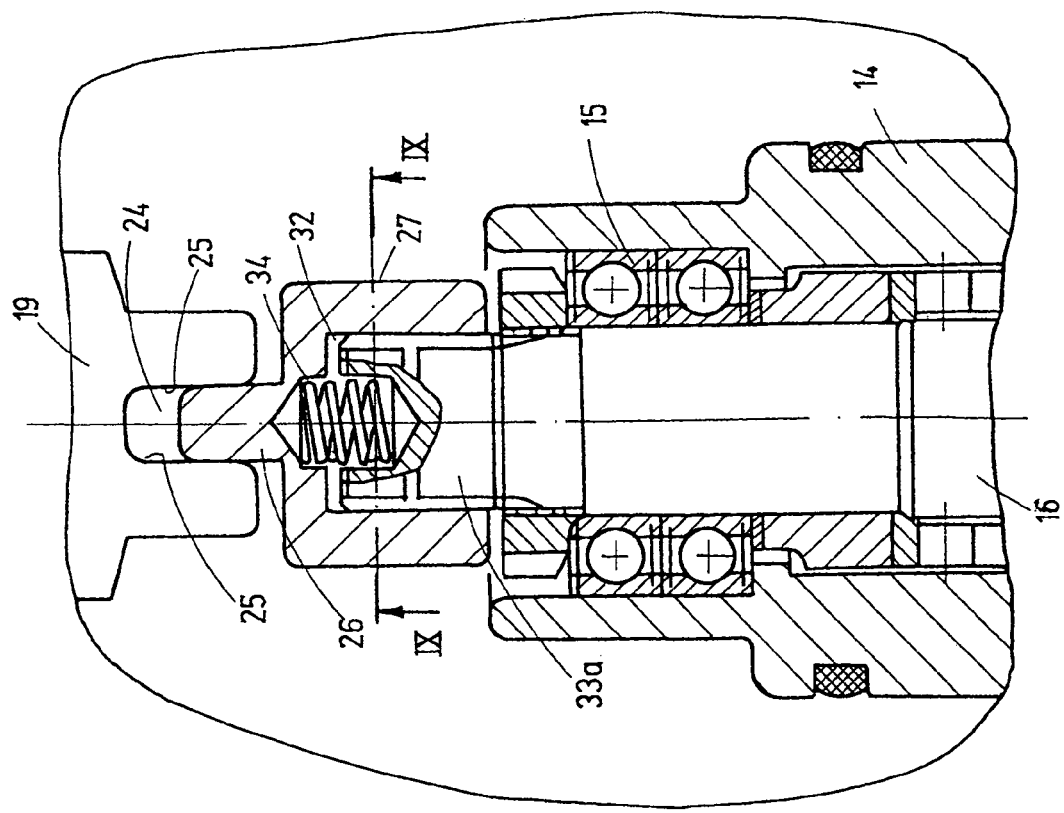

CLUTCH DEVICE FOR TOOL HOLDERS OR FOR WORKPIECE CHUCKING DEVICE

BACKGROUND OF THE INVENTION

The invention relates to a clutch device for tool holders or for workpiece chucking devices for the releasable form-fitting engagement of a drive shaft of an associate drive source with a spindle of the tool holder or of the workpiece chucking device, said spindle being coaxial with said drive source, whereby the drive shaft and the spindle support separate dog elements.

SUMMARY OF THE INVENTION

For example, tool holders for the accommodation of lathe tools, drilling tools, milling tools or other tools required in manufacturing applications, as well as in the form of chucks and the like used for mounting tools that are to be inserted in appropriate receptacles of the tool support, are used in CNC-controlled lathes or lathe centers with movable tool mounts in the form of tool turret disks and the like. The tool holders or tool chucking devices or workpiece chucking devices do not have their own drive, rather, the spindle is coupled in a form-fitting manner via complementary dog elements with a drive shaft of a drive source associated with the tool mount. There are turret disks, which are provided—either on their flat side or on their circumference—with a number of receptacles for tool holders or for chucking devices, each of said receptacles being associated with its own drive shaft, whereby all the drive shafts together are driven by one drive source via a toothed gearing. However, in modern CNC-controlled lathes or lathe centers, revolving disks are now used in most instances, said turret disks comprising a stationary driving source with a single drive shaft that comes into automatic engagement with the spindle of a tool holder or a chucking device when the turret disk is positioned for the respective machining operation. This offers the advantage that only the tool holder or the respective chucking device involved in the machining operation is driven, while the remaining tool holders and chucking devices that are not involved in the machining operation are stopped.

The clutching operation is solely based on the principle of the transfer of torque from the drive shaft to the spindle as defined by German standard DIN 1809 (dogs on tools with cylindrical shaft). The standardized, essentially strip-shaped dog is arranged on the front, either on the drive shaft or on the spindle of the tool holder or of the chucking device, and comes into engagement with a keyway that is provided as the complementary dog element on the spindle or on the drive shaft. The particular advantage of this known and established clutch system consists in that the clutching operation between the drive shaft and the spindle takes place at the same time as the positioning of the tool mount, i.e., for example, the turret disk. Before and during the clutching operation, the dog, as well as the keyway, must be held in an angular position so that they are aligned as precisely as possible with respect to each other, thus allowing the dog to be inserted in the keyway. In order to achieve this without difficulties and in order to adjust for tolerances, a certain play must exist between the dog and the walls of the keyway.

Document DE 199 40 330 C2 discloses a tool chucking device comprising a tool holder for insertion in the receptacle of a tool mount, in which case special measures are provided that make it possible to ensure—without interfering or excessively complex measures on the tool support and without undesirably great operating effort—to ensure a narrow-tolerance fixation of the position of the tool holder relative to the tool support. Despite this measure, it has been found in practice that, in particular at high rotational speeds (above 4000 revolutions per minute) of the spindle of the tool holder, as are required when hard-metal tools are used, vibration phenomena may occur, said phenomena having an unfavorable effect on machining and on the service life of the cutting tools.

Therefore, it is the object of the invention to remedy this in a simple manner.

In order to achieve this object, the clutch device in accordance with the invention displays the features as defined in Patent claim 1.

Considering this, the invention is based on the idea that the previously explained, undesirable phenomena are largely due to actually minimal alignment errors between the drive shaft and the spindle of the tool holder or the chucking device, these requiring a relatively significantly large play between the dog and the keyway at the clutching point between the drive shaft of the stationary drive unit, which is essentially rigidly mounted, and the spindle of the tool holder, which has been moved into the respective operating position. In accordance with the invention, a clutch element is loosely arranged between the two dog elements, i.e., for example, the dog or the keyway of the drive shaft and the dog element of the spindle of the respective tool holder or chucking device, said clutch element compensating for an alignment error between the drive shaft and the spindle and being in form-fitting engagement with the two dog elements.

Referring to a suitable embodiment, the clutch element is held on the drive shaft and/or on the spindle in such a manner that said element cannot be lost and permits minimal play (0.02 mm and less) at the clutching point between the dog and the keyway and, in addition, permits—despite the confined space conditions prevailing in the tool mount receptacle of a tool support, e.g., a turret disk—that alignment errors between the drive shaft and the spindle of the tool holder or the chucking device located on the tool mount, said spindle having been respectively pivoted or moved into engagement with the clutch interface can be compensated for or can be rendered harmless.

The tool holders mentioned here comprise tool holders with a cylindrical shaft as defined by German standard DIN 69880, without restricting the invention thereto. The invention is also applicable to tool holders comprising a mounting flange for the attachment of a tool mount or, quite generally, for the attachment of any type of tool holder and tool chucking devices and workpiece chucking devices that can be mounted to a tool mount. Tool mounts, in terms of the invention, comprise turret disks and turret drums, as well as tool mounts that can be advanced in a linear manner, as are nowadays increasingly used. In general, the clutch device in accordance with the invention is applicable to any system in which it is important to compensate for small alignment errors in confined spatial conditions, said alignment errors occurring at the clutching point between a drive shaft and the spindle of a tool chucking device or a workpiece chucking device.

Additional features and advantages of the clutch device in accordance with the invention are the subject matter of subordinate claims.

Other objects and advantages of the present invention will become apparent to those skilled in the art upon a review of the following detailed description of the preferred embodiments and the accompanying drawings.

BRIEF DESCRIPTION OF THE DRAWINGS

The drawing shows exemplary embodiments of the object of the invention. They show in FIG. 1 is a schematic view of a detail of a lathe with a tool mount that can be moved in the X and Y directions and can be pivoted about a rotary axis, said tool mount being configured as a star turret with two inserted tool holders and with one associate stationary drive source that is coupled with the spindle of a tool holder by means of a clutch device in accordance with the invention;

FIG. 2 is a side view, using a different scale, of a detail of the lathe in accordance with FIG. 1 with its tool mount, depicting the clutching point between the drive shaft of the drive source and the spindle of the tool holder in operative position;

FIG. 3 is a detail of the lathe, in frontal plan view of the workpiece, similar to the one of FIG. 1, however with a tool mount that can be moved in linear direction;

FIG. 4 is a side view along the line IV-IV of FIG. 1 and using a different scale, of a detail of the tool mount of the lathe in accordance with FIG. 1, depicting the clutching point between the drive shaft and the spindle of the tool holder that is coupled with the drive source;

FIG. 5 is a perspective view, using a different scale, of the clutch element of the clutch device in accordance with FIG. 1;

FIG. 6 is a side view similar to FIG. 2 and using a different scale, of the clutch device of the lathe in accordance with FIG. 1;

FIG. 7 is a plan view, along line VII-VII of FIG. 6, of the clutch element of the clutch device in accordance with FIG. 6;

FIG. 8 is a sectional view in accordance with FIG. 6 and using a different scale, of a different embodiment of the clutch device of the lathe in accordance with FIG. 1;

FIG. 9 is a plan view, along line IX-IX of FIG. 8, of the clutch element of the clutch device in accordance with FIG. 8;

DETAILED DESCRIPTION OF THE PREFERRED EMBODIMENT(S)

Figure 1:
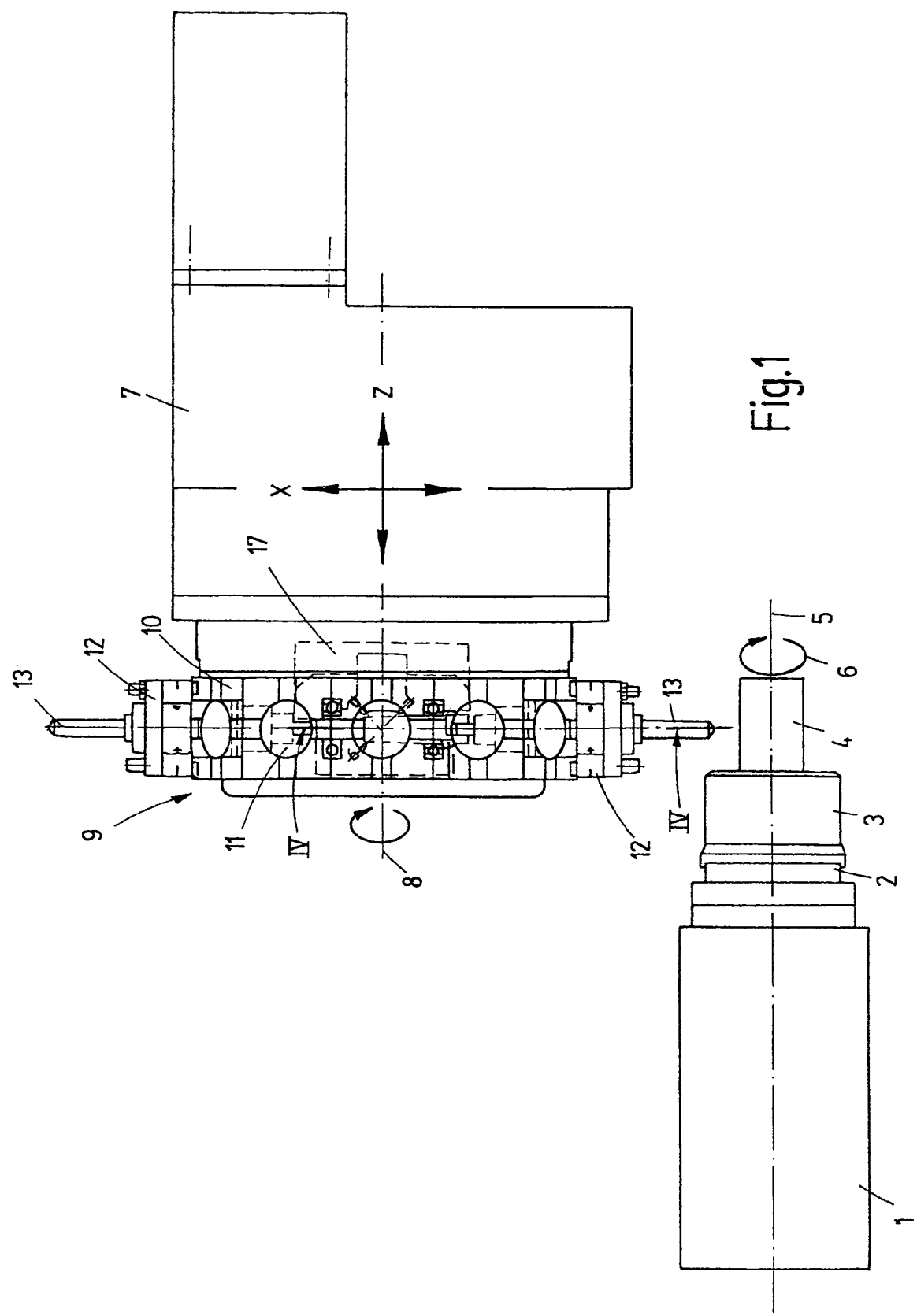

FIG. 1 is a schematic illustration of only a few essential components of a lathe in order to aid the understanding of the invention:

A working spindle 2 is supported in a spindle head 1 so as to be rotatable, said working spindle supporting a chuck 3 in which a workpiece 4 that is to be machined is mounted, whereby said workpiece can be rotated about a rotary axis 5 as is indicated by an arrow 6.

A support 7 is arranged next to the spindle head 1 on the not specifically illustrated machine frame, said support supporting a tool mount 9 configured as a star turret disk and being rotatable about an axis 8, said turret disk being movable by the support in X and Y directions. On its circumference, the star turret disk 10 is provided with equidistant receptacles 11 that essentially extend radially with respect to the axis 8 and that are intended for the accommodation of tool holders for stationary or rotating tools, tool chucking devices or workpiece chucking devices and the like. FIG. 2 shows only two tool holders 12, each holding a driven tool 13, in which case the lower tool holder 12 adjacent to the workpiece is in the operative position.

As is obvious in particular from FIGS. 2 and 4, each of the tool holders 12 has a cylindrical shaft 14 that is used to insert said tool holders in its associate receptacle 11 of the star turret disk 10, said tool holder being in accurately positioned alignment with said receptacle. Regarding details, reference is made to document DE 199 40 330 C2, for example. A spindle 16 that is rotatably supported in the cylindrical shaft 14 by means of roller bearings 15 extends through the cylindrical shaft 14, said spindle being disposed to drive the tool 13 via gearing contained in the tool holder 12.

The spindle 16 of the tool holder 12 being in the lower operative position in accordance with FIG. 1 is driven by a stationary drive unit 17 that is arranged concentric to the axis 8 and is schematically indicated in dashed lines in FIGS. 1, 2. The drive unit 17 representing the drive source for the spindle 16 is stationary and comprises a drive shaft 19 that is rotatably supported in roller bearings 18, whereby said drive shaft can be put into rotation by a bevel gear indicated at 20.

The turret disk 10 that is supported so as to be rotatable about its axis 8 can be advanced intermittently in such a manner that respectively one of the receptacles 11 with the tool holder 12 inserted therein can be positioned in the operative position shown in FIGS. 1 and 2, bottom. In this operative position, the axis 21 of the drive shaft 19 is in exact alignment with the axis 22 of the spindle 16 of the tool holder 12 that is in operative position, whereby alignment errors between the two axes 21, 22 are largely avoided by the appropriate adjustment of the tool mount 12, as is explained in DE 199 40 330 C2, for example.

The spindle 16 of the tool holder 12 that is in operative position is coupled with the drive shaft 19 of the drive unit 17 in a form-fitting manner, so that the torque required for machining the workpiece 4 is transmitted by the drive shaft 19 to the spindle in a non-slip manner. The drive shaft 19 is coupled with the spindle 16 via complementary dog elements that can be brought into engagement with each other at a clutching point 23 (FIG. 2), said clutching point being located radially inside the respective receptacle 11 of the turret disk 10, the details of said clutching point being shown, in particular, in FIGS. 4 through 7 regarding a first embodiment and in FIGS. 8 through 13 regarding a second embodiment:

On its end facing the clutching point 23, the drive shaft 19 has a transversely extending keyway 24, said groove having two flat lateral walls 25 that extend parallel to each other. A strip-like dog 26 of a clutch element 27 may come into engagement—with minimal play (approximately 0.02 mm and less)—with the keyway 24, said clutch element being coupled with the spindle 16 of the tool holder 12 in a form-fitting manner and effecting—in a still to be explained manner—a compensation for alignment errors between the drive shaft 19 and the spindle 16 of the tool holder 12 that is in the working position.

During operation, the spindle 16 of the tool holder 12 that is in operative position is coupled in a non-torsional manner with the drive shaft 19, with the strip-like dog 26 of the clutch element 27 being in engagement with the keyway 24 of said drive shaft, as is shown, for example, by FIGS. 4, 6. Upon completion of the respective machining operation, the turret disk 10 is rotated stepwise, as already mentioned, in order to transfer another tool holder with its associate tool 13 into the operative position. To do so, the drive shaft 19 of the drive unit 17 is first brought to a stop in the angular position shown in FIG. 4, in which one of the lateral walls 25 of the keyway 24 is in exact alignment with an annular guide surface 28 provided on the stationary drive unit 17. During the advance motion of the turret disk 10 that is then started, one lateral surface of the dog 26 of the clutch element 27 of the tool holder 12 moves onto the guide surface 28 which holds said tool holder as the advance motion of the revolver disk 10 continues, as well as the dogs 26 of other tool holders 12 inserted in the receptacles 11, in exact alignment in a plane that is at a right angle with respect to the axis 8 and is pre-specified by the guide path 28. The guide path 28 is interrupted at 29 in the region of the drive shaft 19 in order to receive the end section of the drive shaft 19, said end section being provided with the keyway 24.

During the continued advance motion, the dog 26 of the next-following tool holder 12, said dog being held in the correct position on the guide path 28, is inserted in the keyway 24 that is in exact alignment with said tool holder 12, until the spindle axis 22 and the drive shaft axis 21 are in exact alignment with each other, thus exactly positioning of the turret disk 10 and permitting the tool 13 of the new tool holder 12 to be driven.

Apart from that, the described mode of bringing the spindle 16 of a tool holder 12 in engagement with the drive shaft 19 via the clutch element 27 is not restricted to revolving tool mounts 9 such as the described turret disk 10 but can also be used in linearly movable tool mounts as indicated in FIG. 3. The drive unit 17a is arranged in a stationary manner. The tool holders 12 are inserted next to each other in appropriate receptacles 11 of a, for example, rail-type tool mount 9a, which, as indicated by a double arrow 30, can be cyclically moved in linear direction at a right angle with respect to the drive shaft 19 in such a manner that the dog 26 of each of the tool holders 12 can be transferred into the operative position shown in the center of FIG. 3, in which position said tool holder is coupled with the drive shaft 19 in a form-fitting manner.

In addition to the Y-direction that is indicated by the double arrow 30, the tool holders 12 can be moved in the X and Z directions—in a manner similar to that of FIG. 2—with a carriage 10a of the tool mount 9a.

FIGS. 5 through 7 show a first embodiment of the elements of the inventive clutch device between the drive shaft 19 and the spindle 16 of the tool holder, as depicted, for example, in FIG. 4. As is obvious from FIG. 5, the clutch element is a part with an essentially cylindrical or conical body that supports, on one face, the strip-like dog 26 which is arranged symmetrically with respect to the central longitudinal axis 31 (FIGS. 6, 7). As a rule, the clutch element 27 consists of steel; however basically, said element may also be manufactured of another material that can withstand the stress developing during torque transmission, for example of a plastic material. Furthermore, said clutch element may have a polygonal or any other cross-sectional configuration. Extending from the face opposite the dog 26, there is a bore 32 in the clutch element 27, said bore being coaxial with the axis 31 and having a diameter that corresponds to the diameter of an end-side cylindrical pin 33 of the spindle 16, with however, a certain pre-specified radial play existing between the bore 32 and the spindle pin 33. A keyway 24a is machined into the base of the bore 32, said keyway being defined parallel flanks and opening toward the spindle pin 33. A strip-like dog 26a adjoining the spindle pin 33 and being symmetric with respect to the axis 31, and being basically configured similar to the dog 26 on the outer face of the clutch element 27, comes into engagement with the keyway 24a. The dog 26a comes into engagement with the keyway 24a, displaying minimal pre-specified play. As is particularly obvious from FIG. 7, the dog 26 and the keyway 26a of the clutch element 27 are rotated relative to each other by 90°, so that a cardanic arrangement results between the spindle 16 and the drive shaft 19. Arranged between the clutch element 27 and the spindle pin 33 is a compression spring 34 that is supported on both its sides in spring-receiving bores or spring-guide bores 35 on the bottom of the keyways 24a and 36, respectively, in the front surfaces of the dog 26a. The compression spring 34 is disposed to push the clutch element 26 away from the spindle pin 33.

The clutch element 27 is held on the spindle pin 33 in a manner such that it may not be lost. For this purpose, a circumferential groove 37 is machined into the spindle pin 33, in which groove is positioned a retaining ring 38 having a circular cross-section and coming simultaneously in engagement with a circumferential groove 39 on the inside wall of the bore 32, and, in so doing, retaining the clutch element 27 on the spindle pin 33 so that said clutch element cannot be lost.

Due to the pre-specified play of the retaining ring 38 in the circumferential grooves 37, 39 and the play between the inside wall of the bore 32 and the outside circumferential area of the spindle pin 33, the actually loose—i.e., being movable in a limited manner relative to the drive shaft 19 and the spindle 16—clutch element 27 is able to compensate for alignment errors between the drive shaft 19 and the spindle 16 during the rotary motion. The compression spring 34 biases the clutch element 27 in axial direction against the spindle pin 33 and thus elastically stabilizes the clutch element 27 relative to the spindle pin 16. At the same time, the compression spring 34, in combination with the minimal radial mobility of the clutch element 27 relative to the spindle pin 33, achieves that—during the positioning operation of the tool mount 9, 9a—one of the flat sides of the dog 26 is being held pushed downward at a certain spring bias against the guide surface 28 (FIG. 4). In so doing, a minimal play between the dog 26 and the keyway 24 can be utilized because it is ensured that the dog 26, when being moved into the keyway 24, is held in perfect alignment with said keyway 24.

Considering the exemplary embodiment which is described with reference to FIGS. 6, 7, the keyway 24 and the dog 26 of the clutch element 27 form first complementary clutch elements that are in engagement with each other, while the keyway 24a of the clutch element 27 and the dog 26a of the spindle pin 33 form second dog elements which have substantially the same configuration as the first dog elements. However, on principle, the second dog elements 24a, 26a may have a different configuration than the first dog elements 24, 26; they need only establish a form-fitting engagement between the clutch element 27 and the spindle 16 producing the effect of compensating alignment errors as previously described. Therefore, it would be conceivable, for example, to make the cross section of the spindle pin 33 polygonal and to make the bore 32 correspondingly polygon-like.

Another such embodiment of the second dog elements is shown by FIGS. 8 through 13: The outside of the cylindrical spindle pin 33a is provided with an axis-parallel spline toothing 40 having teeth with an essentially trapezoidal cross-sectional configuration, for example, and whereby said spline toothing meshes with a corresponding axis-parallel spline toothing 41 that is provided on the inside wall of the bore 32 of the clutch element 27. On the inside diameter of the internal spline of the spline toothing 41 there is an annular groove 39 in which engages the retaining ring 38 which, at the same time, also engages in the circumferential groove 37 of the spindle pin 33a and thus holds the clutch element 27 on the spindle pin 33a in such a manner that said clutch element cannot be lost. As is particularly obvious from the enlarged view in accordance with FIG. 10, the clutch element 27 is pushed by the compression spring 34 in the direction of the keyway 24, whereby the retaining ring 38 is pressed against a radial planar surface 42 of the circumferential groove 37. The circumferential groove 37 has a width greater than the diameter of the retaining ring 38, so that the clutch element 27 displays—against the bias of the spring 34—a limited axial mobility relative to the spindle pin 33a, as is the case in the same manner with the exemplary embodiment in accordance with FIGS. 6, 7. The retaining ring 38, in turn, is held biased in radial direction toward the outside and is radially fixed in place by the circumferential groove 39, so that said ring cannot open as a result of the centrifugal forces occurring during operation.

Figure 10:
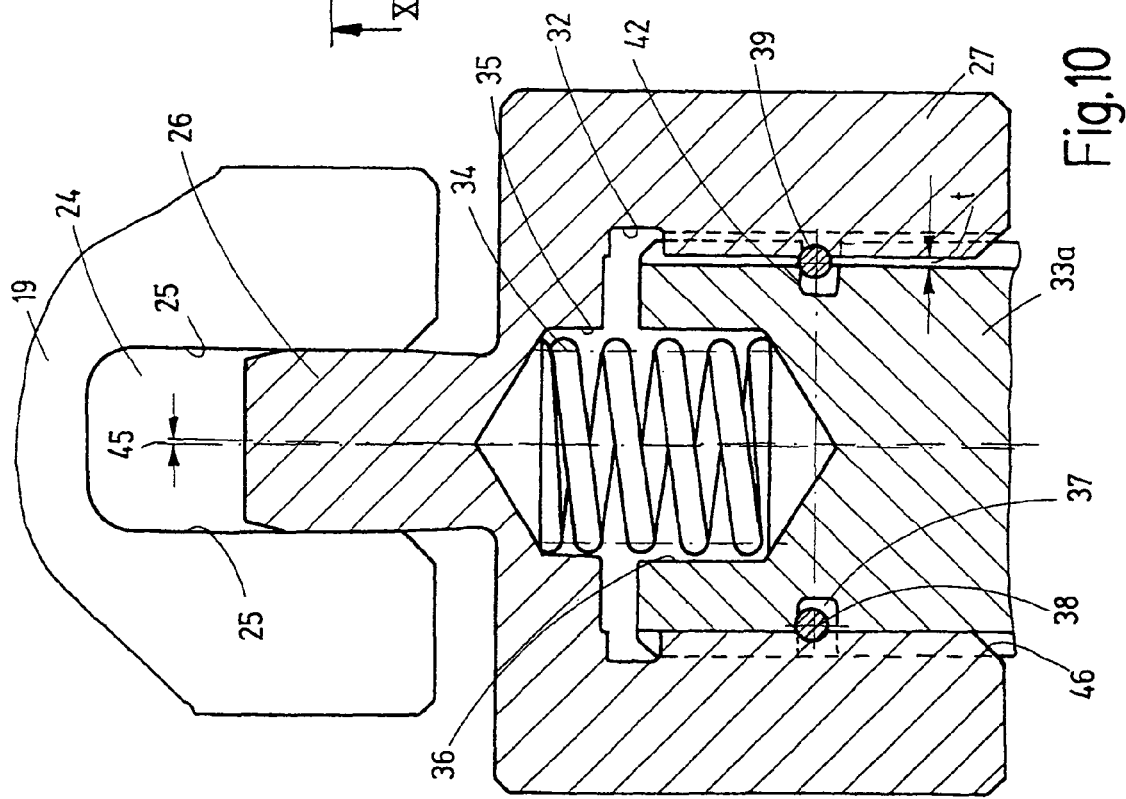
FIG. 10 is an enlarged view of a partial region of the clutch device in accordance with FIG. 8.

A specific meshing play "t" exists between the meshing spline toothings 40, 41, this being shown enlarged in FIGS. 9, 10 for better explanation.

During the transmission of torque from the drive shaft 19 to the spindle 16, a one-sided abutment of the flanks of the toothing 40 against the tooth flanks 44 of the toothing 41 occurs as a function of the direction of rotation. This one-sided abutment of the tooth flanks causes a self-centering of the clutch element 27 and counter-acts a deflection of the clutch element 27 out of the common axial central position. The maximum axis offset or the radial deflection, in so doing, is limited by the pre-specified toothing play t. FIG. 9 shows a deflection of the clutch element 27 toward the spindle pin 33a transversely to the dog 26 which, in this direction, would otherwise—due to the minimized play in the coupling groove—not be able to yield sufficiently to compensate for an alignment error.

Because, as is obvious from FIG. 10 and as has already been explained, the circumferential groove 37 is deeper in radial direction and also wider in axial direction than the retaining ring 38, a position change or angle change of the clutch element 27 within the pre-specified toothing play t is not impaired, so that, as indicated in FIG. 10 at 45, an axial offset of the axis 21 of the drive shaft 19 relative to the spindle axis 22 transverse to the dog 26 is possible within the toothing play "t" and, therefore, the dog 26 can function, with minimal play, in the keyway 24, thus compensating for the alignment errors. The toothings 40, 41 permit a simple mounting of the clutch elements on the spindle pin 33a, said mounting being additionally facilitated by the conical annular surface 36 on the edge of the bore 32 of the clutch element 27.

Figure 13:
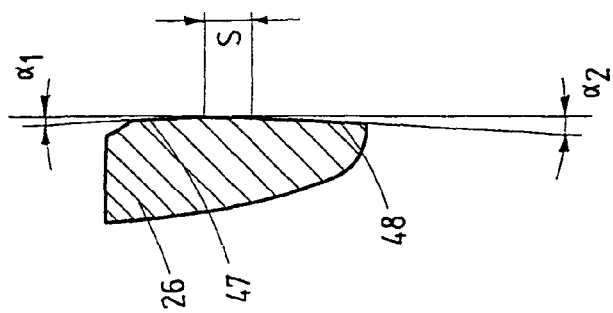
Figure 12:
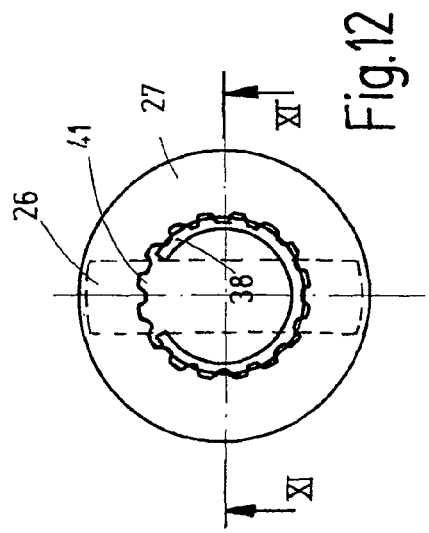
FIG. 12 is a plan view of the bore of the clutch element of the clutch device in accordance with FIG. 8, with the inserted retaining ring, and using a different scale; and, FIG. 13 is a detail at "A" of an analogous sectional view of the clutch element in accordance with FIG. 11 in order to illustrate details.
Figure 11:
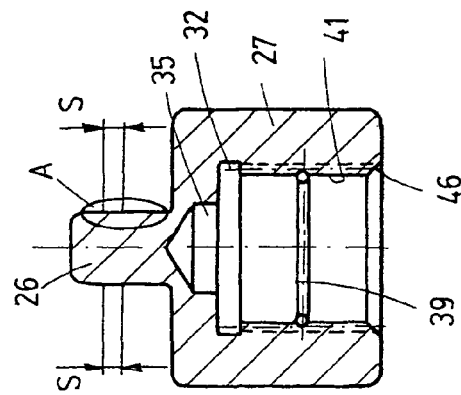
FIG. 11 is a side view, along line XI-XI of FIG. 12, of the clutch element of the clutch device in accordance with FIG. 8.

In both explained embodiments, the dog 26 has the configuration that is obvious from FIGS. 11, 13. In particular, FIG. 13 shows that the dog, on its two opposing lateral surfaces, is parallel only in a partial area "s" with respect to the abutting lateral wall 25 of the keyway 24. The start and end areas 47, 48 bordering the partial area s are freely formed about an angle α1 or α2, so that the dog 26 may slightly yield at an angle in a direction transverse with respect to the keyway 24, i.e., said dog may perform a minimal, limited tilting movement.

The same result could also be achieved with an appropriate configuration of the profile of the lateral walls 25 of the keyway 24.

While, referring to the described exemplary embodiments of the new clutch device, the coupling groove 24 is provided on the drive shaft 19—while the clutch element 27 supports the appropriate complementary dog 26—the arrangement could also be in reverse, i.e., that the dog 26 is provided on the drive shaft 19, and the keyway 24 is provided on the clutch element 27. Also, the new clutch device can be used in arrangements, in which the first dog elements 24, 26—different from the illustrated embodiments—are not configured as a keyway and a strip-like dog but are configured in another manner so that a form-fitting torque transfer via the dog elements is possible.

Finally, it should also be mentioned that the strip-like dog 26—different from the embodiment in accordance with FIG. 5—may also be rounded instead of having the lateral chamfers 49, or be otherwise configured in a manner facilitating the insertion into the keyway 24, this also being overall applicable to the configuration of the edges of said dog.

On principle, it would also be conceivable that the clutch element 27—which is actually loose—is not held, in a manner so as not to be lost, on the spindle pin 33 or 33a but, by using an appropriate configuration of the dog elements, on the drive shaft 19 or on a part of the tool holder 12 (e.g., the cylindrical shaft 14), or on a part of the drive unit 17.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. Clutch device for tool holders or for tool chucking devices or workpiece chucking devices for the releasable form-fitting engagement of a drive shaft (19) of an associate drive source (17) with a spindle (16) of the tool holder (12) or of the chucking device, wherein the drive shaft (19) and the spindle (16) support separate dog elements (24, 26a, 40), and wherein a clutch element (27) compensating for an alignment error between the drive shaft and the spindle is arranged between the two dog elements, whereby the movement of said clutch element is restricted with respect to the drive shaft and the spindle, and wherein said clutch element is provided with appropriate dog elements (24, 24a) and is coupled in a form-fitting manner with the dog elements of the drive shaft and of the spindle, said the dog elements comprising a keyway (24) extending transversely to the drive shaft (19) or to the spindle (16), or a strip-shaped dog (26; 26a) and said clutch element being held on one of the drive shaft or spindle by locking means (37, 38).

2. Clutch device in accordance with claim 1, characterized in that one first dog element of the clutch element is configured as a keyway (24a), and a second dog element of the clutch element is configured as a strip-shaped dog and that the dog (26) and the keyway (24) on the clutch element (27) are arranged so as to be rotated relative to each other by an angle of 90 degrees.

3. Clutch device for tool holders or for tool chucking devices or workpiece chucking devices for the releasable form-fitting engagement of a drive shaft (19) of an associate drive source (17) with a spindle (16) of the tool holder (12) or of the chucking device, wherein the drive shaft (19) and the spindle (16) support separate dog elements (24, 26a, 40), and wherein a clutch element (27) compensating for an alignment error between the drive shaft and the spindle is arranged between the two dog elements, whereby the movement of said clutch element is restricted with respect to the drive shaft and the spindle, and wherein said clutch element is coupled in a form-fitting manner with the dog elements of the drive shaft and of the spindle, characterized in that the dog elements comprise, as a first dog element, a keyway (24) extending transversely to the drive shaft (19) or to the spindle (16), or a strip-shaped dog element; and that the clutch element (27) has, on one face, a strip-shaped dog (26) coming into engagement with the keyway (24) with minimal play, or a keyway; and that the clutch element (27) has, on its other side, a second dog element (26a; 41) that is different from said first dog elements (24, 26) for the form-fitting engagement with a corresponding dog element (26a; 40) on the spindle (16) or on the drive shaft (19).

4. Clutch device in accordance with claim 3, characterized in that the clutch element (27) has, as a second dog element, a bore (32) that is coaxial with a longitudinal axis (31) of said clutch element, said bore being designed for the accommodation and the form-fitting passive movement of an appropriately configured pin-shaped dog element (33, 33a) on the spindle (16) or on the drive shaft (19).

5. Clutch device in accordance with claim 4, characterized in that the bore (32) is provided with an axis-parallel spline toothing (41), and that the pin-shaped dog element (33a) is provided with a corresponding spline toothing (40).

6. Clutch device in accordance with claim 4, characterized in that the bore (32) has a polygonal cross-sectional profile, and that the pin-shaped dog element has a corresponding polygonal cross-section.

7. Clutch device in accordance with claim 4, characterized in that a pre-specified minimal play (t) exists between the second dog element of the clutch element (27) and the pin-shaped dog element (33, 33a) on the spindle (16) or on the drive shaft.

8. Clutch device in accordance with claim 4, characterized in that the clutch element (27) is held on the spindle (16) or on the drive shaft (19) by means of a locking element (38), which can be elastically spread in radial direction and which is in form-fitting contact with the inside wall of the bore (32) of the second dog element, in order to prevent the loss of said clutch element.

9. Clutch device in accordance with claim 8, characterized in that the locking element is a spring-elastic retaining ring (38) which, permitting limited axial mobility of the clutch element (27) with respect to the drive shaft (14) and/or the spindle (16), comes into engagement with corresponding locking grooves (37, 39) on the pin-shaped dog element (33, 33a) and/or on the inside wall of the bore (32) of the clutch element (27).

10. Clutch device for tool holders or for tool chucking devices or workpiece chucking devices for the releasable form-fitting engagement of a drive shaft (19) of an associate drive source (17) with a spindle (16) of the tool holder (12) or of the chucking device, wherein the drive shaft (19) and the spindle (16) support separate dog elements (24, 26a, 40), and wherein a clutch element (27) compensating for an alignment error between the drive shaft and the spindle is arranged between the two dog elements, whereby the movement of said clutch element is restricted with respect to the drive shaft and the spindle, and wherein said clutch element is coupled in a form-fitting manner with the dog elements of the drive shaft and of the spindle characterized in that the clutch element (27) is resiliently biased in axial direction with respect to the drive shaft (19) and/or the spindle (16).

11. Clutch device in accordance with claim 10, characterized in that spring means (34) are set in the axial bore (32) of the clutch element (27), said means being used to be able to elastically bias the clutch element (27) in axial direction.

12. Clutch device in accordance with claim 11, characterized in that the spring means comprise a compression spring (34) that is coaxial with the bore axis, said compression spring being guided at least on one side in a guide bore (35, 36) of the clutch element (27) or of the pin-shaped dog element (33, 33a) on the spindle (16) or on the drive shaft (19).

13. Clutch device in accordance with claim 8, characterized in that the clutch element can be moved relative to the pin-shaped dog element (33, 33a) radially and in axial direction in a limited manner, and is biased by spring means (34), against the locking means (38), in axial direction.

14. Clutch device in accordance with claim 1, characterized in that the strip-shaped dog (26) and/or the lateral walls (25) of the keyway (24) interacting therewith have a configuration permitting a limited minimal tilting motion of the dog (26) and the keyway (24) relative to each other.

15. Clutch device in accordance with claim 14, characterized in that, if the keyway (24) has parallel flanks, the strip-shaped dog has a polygonal cross-section or a crowned cross-sectional profile (47, s, 48).

16. Clutch device for tool holders or for tool chucking devices or workpiece chucking devices for the releasable form-fitting engagement of a drive shaft (19) of an associate drive source (17) with a spindle (16) of the tool holder (12) or of the chucking device, wherein the drive shaft (19) and the spindle (16) support separate dog elements (24, 26a, 40), and wherein a clutch element (27) compensating for an alignment error between the drive shaft and the spindle is arranged between the two dog elements, whereby the movement of said clutch element is restricted with respect to the drive shaft and the spindle, and wherein said clutch element is coupled in a form-fitting manner with the dog elements of the drive shaft and of the spindle characterized in that the tool holder (12) and/or the workpiece chucking device are set up for use in an appropriate receptacle (11) of a tool mount and/or workpiece mount (9), in which the respective drive shaft (19) is rotatably supported in fixed association with at least one receptacle (11).

17. Clutch device in accordance with claim 16, characterized in that the tool mount (9, 10a) is supported so as to be rotatable about an axis (8) or so as to be adjustable along a pre-specified path.

18. Clutch device in accordance with claim 17, characterized in that the tool mount (12) is configured so that it can be positioned, respectively, in a pre-specified position relative to the axis (8) or that it can be positioned on its path of movement.

19. Clutch device for tool holders or for tool chucking devices or workpiece chucking devices for the releasable form-fitting engagement of a drive shaft (19) of an associate drive source (17) with a spindle (16) of the tool holder (12) or of the chucking device, wherein the drive shaft (19) and the spindle (16) support separate dog elements (24, 26a, 40), and wherein a clutch element (27) compensating for an alignment error between the drive shaft and the spindle is arranged between the two dog elements, whereby the movement of said clutch element is restricted with respect to the drive shaft and the spindle, and wherein said clutch element is coupled in a form-fitting manner with the dog elements of the drive shaft and of the spindle characterized in that said clutch element has a longitudinal body which, on one face, is provided with a first dog element (26; 24) and on its opposite face, with a second dog element (24a, 41), and that its dog elements are set up for the form-fitting engagement with complementary dog elements on a spindle (16) of a tool mount (12) or of a chucking device or of a drive shaft (19) of a drive source (17).

20. Clutch device in accordance with claim 19, characterized in that said clutch element has, on its one side, a dog (26) or a keyway (24) and has, on its opposite face, a coaxial bore (32) which is set up for the form-fitting engagement with a complementary clutch element on the spindle (16) or on the drive shaft (19).

21. Clutch device in accordance with claim 20, characterized in that the bore contains axis-parallel spline toothing (41).

22. Clutch device in accordance with claim 21, characterized in that the bore (32) has, at its bottom, a keyway (24*a*), said keyway being rotated by 90° with respect to the strip-like dog (26) on the one face.

23. Clutch device in accordance with claim 20, characterized in that the clutch element is provided with locking means (37, 38) configured to come into engagement with complementary locking means on the spindle or the drive shaft.

24. Clutch device in accordance with claim 23, characterized in that said locking means comprise a locking groove (39) on an inside wall of said bore of the clutch element that is configured to receive a locking element (38).

25. Clutch device in accordance with claim 23, characterized in that said clutch element comprises a guide bore (35) configured to receive and guide a compression spring (34), said guide bore (35) being coaxial with said bore (32).

26. Clutch device in accordance with claim 1, characterized in that the clutch element can be moved relative to the pin-shaped dog element (26,26*a*) on the keyway (24) radially and in axial direction in a limited manner, and is biased by spring means (34), against the locking means (38), in axial direction.

27. Clutch device in accordance with claim 14, characterized in that the clutch element can be moved relative to the pin-shaped dog element (26) radially and in axial direction in a limited manner, and is biased by spring means (34), against the locking means (38), in axial direction.

\* \* \* \* \*